(12) United States Patent
Miranda et al.

(10) Patent No.: US 6,908,652 B1
(45) Date of Patent: Jun. 21, 2005

(54) POLY(LACTIC ACID) IN OXYGEN SCAVENGING ARTICLE

(75) Inventors: Nathanael R. Miranda, Spartanburg, SC (US); Drew V. Speer, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/445,645

(22) PCT Filed: Sep. 18, 1997

(86) PCT No.: PCT/US97/16522
§ 371 (c)(1),
(2), (4) Date: Aug. 17, 2000

(87) PCT Pub. No.: WO98/12250
PCT Pub. Date: Mar. 26, 1998

Related U.S. Application Data
(60) Provisional application No. 60/019,805, filed on Sep. 18, 1996.

(51) Int. Cl.[7] .................... B29D 22/00; B29D 23/00; B32B 1/08
(52) U.S. Cl. ............... 428/36.7; 428/36.6; 428/35.4; 428/35.2; 428/35.7
(58) Field of Search ................... 428/215, 219, 428/249, 516, 35.2, 35.7, 35.8, 35.9, 36.6, 35.4, 35.5, 36.7

(56) References Cited

U.S. PATENT DOCUMENTS

| | | | |
|---|---|---|---|
| 3,527,841 A | 9/1970 | Wicker et al. | 260/823 |
| 5,126,174 A | 6/1992 | Courtwright et al. | 428/34.3 |

(Continued)

FOREIGN PATENT DOCUMENTS

| | | |
|---|---|---|
| EP | 507 207 | 10/1992 |
| EP | 952 179 | 10/1999 |
| EP | 0 485 847 B1 | 3/2000 |
| JP | 6-64664 | 3/1994 |
| JP | 9-12748 | 1/1997 |
| JP | 10-24518 | 1/1998 |
| JP | 10-29159 | 11/1998 |
| WO | WO 94/06856 | 3/1994 |
| WO | WO 94/09084 | 4/1994 |
| WO | 94/12590 | * 6/1994 ........... C09K/15/04 |
| WO | WO 97/32722 | 9/1997 |

OTHER PUBLICATIONS

Nicole Whiteman, "New Packaging Thermoplastic, Polylactide", 2000 TAPPI Polymers, Laminations, & Coatings Conference, pp. 631–635.

(Continued)

*Primary Examiner*—Harold Pyon
*Assistant Examiner*—Michael C. Miggins
(74) *Attorney, Agent, or Firm*—Mark B. Quatt

(57) ABSTRACT

An article of manufacture includes an oxygen scavenger and poly(lactic acid). The article can be in the form of a film, coating, gasket, liner, insert, sealant, or fibrous matte. A film includes at least one layer including an oxygen scavenger, and at least one layer including poly(lactic acid). A package can be made from the film for enclosing an oxygen-sensitive artice such as food. The poly(lactic acid) blocks the migration of odor causing byproducts of the oxygen scavenging process. A method includes providing a film including at least one layer including an oxygen scavenger; and at least one layer including the poly(lactic acid); and exposing the film to actinic radiation. A method for reducing migration of organoleptically significant compounds is also disclosed.

14 Claims, 1 Drawing Sheet

U.S. PATENT DOCUMENTS

| | | |
|---|---|---|
| 5,143,763 A | 9/1992 | Yamada et al. ............ 428/36.2 |
| 5,211,875 A | 5/1993 | Speer et al. ........... 252/188.28 |
| 5,350,622 A * | 9/1994 | Speer et al. ................ 428/215 |
| 5,380,813 A * | 1/1995 | Seppala et al. ............... 528/58 |
| 5,443,780 A | 8/1995 | Matsumoto et al. ..... 264/290.2 |
| 5,444,113 A * | 8/1995 | Sinclair et al. ............. 524/306 |
| 5,556,711 A | 9/1996 | Ajioka et al. |
| 5,648,020 A | 7/1997 | Speer et al. |
| 5,800,887 A | 9/1998 | Koyama |

OTHER PUBLICATIONS

"Development of Food Packaging", Ecological Packing Research Union for Food Industry, Nov. 1, 1995, pp. 10–11, 30–33 and 171–173.

"Biaxially Extended Poly(lactic acid) Film", PACKPIA No. 523 1996/2, pp. 12–19, 1996.

"Biodegradable Polymer "LACEA" (poly(lactic acid))", PACKPIA No. 523 1996/2, pp. 28–32, 1996.

* cited by examiner

POLY(LACTIC ACID) IN OXYGEN SCAVENGING ARTICLE

This application claims the benefit of U.S. Provisional Application No. 60/019,805, filed Sep. 18, 1996.

FIELD OF THE INVENTION

The invention generally relates to compositions, articles or methods for scavenging oxygen in environments containing oxygen-sensitive products, particularly food and beverage products.

BACKGROUND OF THE INVENTION

It is well known that regulating the exposure of oxygen-sensitive products to oxygen maintains and enhances the quality and "shelf-life" of the product. In the food packaging industry, several means for regulating oxygen exposure have already been developed.

These means include modified atmosphere packaging (MAP) for modifying the interior environment of a package; gas flushing; vacuum packaging; vacuum packaging combined with the use of oxygen barrier packaging materials; etc. Oxygen barrier films and laminates reduce or retard oxygen permeation from the outside environment into the package interior.

Another method currently being used is through "active packaging." The inclusion of oxygen scavengers within the cavity or interior of the package is one form of active packaging. Typically, such oxygen scavengers are in the form of sachets which contain a composition which scavenges the oxygen through chemical reactions. One sachet contains iron compositions which oxidize. Another type of sachet contains unsaturated fatty acid salts on a particulate adsorbent. Yet another sachet contains metal/polyamide complex. However, one disadvantage of sachets is the need for additional packaging operations to add the sachet to each package. A further disadvantage arising from some sachets is that certain atmospheric conditions (e.g., high humidity, low $CO_2$ level) in the package are sometimes required in order for scavenging to occur at an adequate rate.

Another means for regulating the exposure to oxygen involves incorporating an oxygen scavenger into the packaging structure itself. Through the incorporation of the scavenging material in the package itself, a more uniform scavenging effect throughout the package is achieved. This may be specially important where there is restricted air circulation inside the package. In addition, such incorporation can provide a means of intercepting and scavenging oxygen as it is passing through the walls of the package (herein referred to as an "active oxygen barrier"), thereby maintaining the lowest possible oxygen level throughout the package.

One attempt to prepare an oxygen-scavenging wall involves the incorporation of inorganic powders and/or salts. However, incorporation of these powders and/or salts causes degradation of the wall's transparency and mechanical properties such as tear strength. In addition, these compounds can lead to processing difficulties, especially in the fabrication of thin films, or thin layers within a film structure. Even further, the scavenging rates for walls containing these compounds are unsuitable for some commercial oxygen scavenging applications, e.g. such as those in which sachets are employed.

Other efforts have been directed to incorporating a metal catalyst-polyamide oxygen scavenging system into the package wall. However, this system does not exhibit oxygen scavenging at a commercially feasible rate.

Oxygen scavengers suitable for commercial use in films of the present invention are disclosed in U.S. Pat. No. 5,350,622 and U.S. Pat. No. 5,399,289 to Speer et al., and a method of initiating oxygen scavenging generally is disclosed in U.S. Pat. No. 5,211,875. All of these patents are incorporated herein by reference in their entirety. According to U.S. Pat. No. 5,350,622, oxygen scavengers are made of an ethylenically unsaturated hydrocarbon and transition metal catalyst. The preferred ethylenically unsaturated hydrocarbon may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene-butadiene. Such hydrocarbons also include polymeric compounds such as polypentenamer, polyoctenamer, and other polymers prepared by olefin metathesis, diene oligomers such as squalene, and polymers or copolymers with unsaturation derived from dicyclopentadiene, norbornadiene, 5-ethylidene-2-norbornene, 5-vinyl-2norbornene, 4-vinylcyclohexene, or other monomers containing more than one carboncarbon double bond (conjugated or non-conjugated).

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification. Such polymers are disclosed in WO 95/02616. The application is incorporated herein by reference as if set forth in full. The composition used may also comprise a mixture of two or more of the substituted or unsubstituted ethylenically unsaturated hydrocarbons described above. While a weight average molecular weight of 1,000 or more is preferred, the ethylenically unsaturated hydrocarbon having a lower molecular weight is usable, provided it is blended with a film-forming polymer or blend of polymers.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is preferred.

When making transparent oxygen-scavenging layers according to this invention, 1,2-polybutadiene is especially preferred for use at room temperature. For instance, 1,2-polybutadiene can exhibit transparency, mechanical properties and processing characteristics similar to those of polyethylene. In addition, this polymer is found to retain its transparency and mechanical integrity even after most or all of its oxygen capacity has been consumed, and even when little or no diluent resin is present. Even further, 1,2-polybutadiene exhibits a relatively high oxygen capacity and, once it has begun to scavenge, it exhibits a relatively high scavenging rate as well.

When oxygen scavenging at low temperatures is desired, 1,4-polybutadiene, and copolymers of both styrene with butadiene and styrene with isoprene are especially preferred. Such compositions are disclosed in U.S. Pat. No. 5,310,497 issued to Speer et al. on May 10, 1994 and incorporated herein by reference as if set forth in full. In many cases it may be desirable to blend the aforementioned polymers with a polymer or copolymer of ethylene.

Other oxygen scavengers which can be used in connection with this invention incdude an ascorbate with a transition metal catalyst, the catalyst being a simple metal or salt or a compound, complex or chelate of the transition metal, or a transition metal complex or chelate of a polycarboxylic or salicylic acid, optionally with a reducing agent such as ascorbate, where the transition metal complex or chelate acts primarily as an oxygen scavenging composition. Isoascorbates, sulfites, alkali metal salts of ascorbates, alkali metal salts of isoascorbates, or alkali metal salts of sulfites, or tannins, are also contemplated as oxygen scavenging compounds.

Still other oxygen scavengers which can be used in connection with this invention are disclosed in PCT patent publication WO 94/12590 (Commonwealth Scientific and Industrial Research Organisation), incorporated by reference herein in its entirety. These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

As indicated above, the ethylenically unsaturated hydrocarbon is combined with a transition metal catalyst. While not being bound by any particular theory, the inventors observe that suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, caprylate, linoleate, tallate, 2-ethylhexanoate, neodecanoate, oleate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

The ethylenically unsaturated hydrocarbon and transition metal catalyst may be further combined with one or more polymeric diluents, such as thermoplastic polymers which are typically used to form film layers in plastic packaging articles. In the manufacture of certain packaging articles well known thermosets can also be used as the polymeric diluent. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. Blends of different diluents may also be used. However, as indicated above, the selection of the polymeric diluent largely depends on the article to be manufactured and the end use. Such selection factors are well known in the art. Further additives may also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc.

The mixing of the components listed above is preferably accomplished by meltblending at a temperature in the range of 50° C. to 300° C. However alternatives such as the use of a solvent followed by evaporation may also be employed. The blending may immediately precede the formation of the finished article or preform or precede the formation of a feedstock or masterbatch for later use in the production of finished packaging articles.

Although oxygen scavenging technology offers great potential in packaging applications, it has been found that oxygen scavenging structures can generate reaction byproducts which can affect the taste and smell of the packaged material, or raise food regulatory issues. These by-products include aldehydes, organic acids, and ketones. This problem can be minimized by the use of poly(lactic acid). This material can block the migration of certain odor-causing reaction byproducts, and can be incorporated into one or more layers of a multilayer film between the oxygen scavenging layer and the packaged material, e.g. food material. It also has a beneficially high oxygen transmission rate which allows for rapid oxygen scavenging from the package interior. However, one of ordinary skill in the art will readily recognize that the present invention is applicable to any oxygen scavenging system that produces by-products such as aldehydes.

DEFINITIONS

"Film" herein means a film, laminate, sheet, web, or the like which can be used to package a product. "Oxygen scavenger" (OS) and the like herein means a composition, article or the like which consumes, depletes or reacts with oxygen from a given environment. "Poly(lactic acid) as used herein refers to a polymer having more than 50% by weight lactic acid units. This material can be either the right-handed (D) or left-handed (L) enantiomer of an optical isomer, or can be a racemic mixture of the two enantiomers. It is preferably unplasticized, but can also be used in a plasticized state with residual monomer, oligomer, etc. "Functional barrier" herein means a material that allows the transport of certain molecules (e.g. oxygen) while blocking or otherwise interfering with the transport of other molecules.

"Actinic radiation" herein means any form of radiation, such as ultraviolet radiation, disclosed in U.S. Pat. No. 5,211,875 (Speer et al.) incorporated herein by reference in its entirety.

"Polymer" and the like herein means a homopolymer, but also copolymers thereof, including bispolymers, terpolymers, etc.

"EVA" herein means ethylene vinyl acetate copolymer.

"LDPE" herein means low density polyethylene.

"LLDPE" herein means linear low density polyethylene, which is an ethylene alpha olefin copolymer.

"Ethylene alpha-olefin copolymer" and the like herein means such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/a-olefin copolymers, such as the long chain branched homogeneous ethylene/a-olefin copolymers available from the Dow Chemical Company, known as AFFINITY (TM) resins, are also included as another type of ethylene alpha-olefin copolymer useful in the present invention.

SUMMARY OF THE INVENTION

In a first aspect of the invention, an article of manufacture comprising an oxygen scavenger and poly(lactic acid).

In a second aspect of the invention, a package comprises an oxygen sensitive article; and a container into which the oxygen sensitive article is disposed, the container comprising a layer comprising an oxygen scavenger, and a layer comprising poly(lactic acid).

In a third aspect of the invention, a method of making an article of manufacture comprises providing an article comprising a layer comprising an oxygen scavenger, and a layer comprising poly(lactic acid); and exposing the article to actinic radiation.

In a fourth aspect of the invention, a method of reducing the migration of an organoleptically significant compound through an article comprising the step of providing an article comprising a poly(lactic acid).

In preferred embodiments, a film comprises at least one layer comprising an oxygen scavenger, and at least one layer comprising poly(lactic acid). The oxygen scavenger preferably comprises an ethylenically unsaturated hydrocarbon and transition metal catalyst. The film can further comprise an oxygen barrier layer, an abuse resistant layer, a heat sealable layer, and/or an intermediate adhesive layer disposed between any of the abuseresistant layer and oxygen barrier layer, between the oxygen barrier layer and the layer comprising the oxygen scavenger between the layer comprising the oxygen scavenger and the layer comprising the poly(lactic acid), and between the layer comprising the poly(lactic acid) and the heat sealable layer. The film can optionally be cross-linked, and can optionally be oriented. The film can optionally be heat shrinkable.

BRIEF DESCRIPTION OF THE DRAWINGS

The invention may be further understood with reference to the drawings wherein.

DESCRIPTION OF THE PREFERRED EMBODIMENTS

Figure 1:
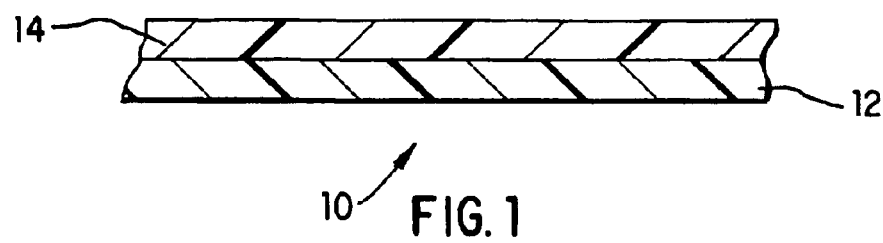
FIG. 1 is a schematic cross-section of a film of the present invention.

The invention can be used to make various articles of manufacture, compounds, compositions of matter, coatings, etc. Three preferred forms are: sealing compounds or gaskets; a polymeric functional barrier coating on an oxygen scavenging lacquer; and flexible films, all useful in packaging of food and non-food products.

It is known to use sealing compounds in the manufacture of gaskets for the rigid container market. Large, wide diameter gaskets are typically made using a liquid plastisol. This plastisol is a highly viscous, liquid suspension of polymer particles in a plasticizer. In the manufacture of metal or plastic caps, lids, and the like, this liquid plastisol is applied to the annulus of a container such as a jar, and the container with the applied plastisol is "fluxed" in an oven to solidify the plastisol into a gasket. The result is a gasket formed around the annulus of the container.

Smaller gaskets are typically made for use in beer crowns in bottles. A polymer melt is applied by cold molding to the entire inner surface of the crown. Both PVC and ther polymers are used in this application.

Discs for plastic caps are typically made by taking a ribbon of gasket material and making discs, and inserting the discs into the plastic cap.

In all of these applications, the use of an oxygen scavenger and a poly(lactic acid) beneficially provides removal of oxygen from the interior environment of the container, while controlling undesirable by-products of the oxygen scavenging reaction.

Thus, a gasket includes an oxygen scavenger, and a poly(lactic acid). The gasket adheres a metal or plastic lid or closure to a rigid or semi-rigid container, thus sealing the lid or closure to the container.

A lacquer for cans or other rigid or semi-rigid containers can contain an oxygen scavenging material, e.g. of the type described herein, and be coated with a poly(lactic acid).

Film of the invention can been made by any conventional means, including coextrusion, lamination, extrusion coating, solution coating, or corona bonding, and then optionally irradiated and/or oriented. They can be made heat shrinkable through orientation or tenterframing if desired, at orientation ratios of 1:2 to 1:9 in either or both of the machine and transverse directions. For shrink applications, they can be made to have a free shrink of at least 10%, more preferably at least 20%, most preferably at least 30%, in either or both directions at 90° C. The poly(lactic acid) can be used in more than one layer of the multilayer film. Different polymeric functional barriers can be used in the same film. Although it is preferred that the poly(lactic acid) be used in the film and as a packaging material such that the poly(lactic acid) is disposed closer to the contents of the package, which can be food or any oxygen-sensitive product, than the oxygen scavenger, there may be applications where the poly(lactic acid) is disposed "outside of" the oxygen scavenger, such that the oxygen scavenger is disposed closer to the contents of the package than the poly(lactic acid). The poly(lactic acid) can also be disposed on both sides of the oxygen scavenger.

Alternatively, the functional barrier, in addition to or instead of the arrangements described elsewhere herein, can be disposed in the same layer or layers -as the oxygen scavenging material. Thus, by way of example, any of layers 14 of the examples and figures can include any suitable percent, by weight of the layer, of the functional barrier. Any suitable polymeric materials can be employed in films containing the functional barrier, and are not limited to those listed herein.

Poly(lactic acid) disclosed herein can thus be used beneficially with and in films and coatings, or absorbed into, or adsorbed onto, a variety of other supports for scavenging or other uses, such as a layer or coating on another object, or as a bottle cap or bottle liner, as an adhesive or non-adhesive insert, sealant, gasket, fibrous matte or other inserts, or as a non-integral component of a rigid, semi-rigid, or flexible container.

Referring to FIG. 1, a multilayer film 10 is shown, having layer 12 and layer 14.

Figure 2:
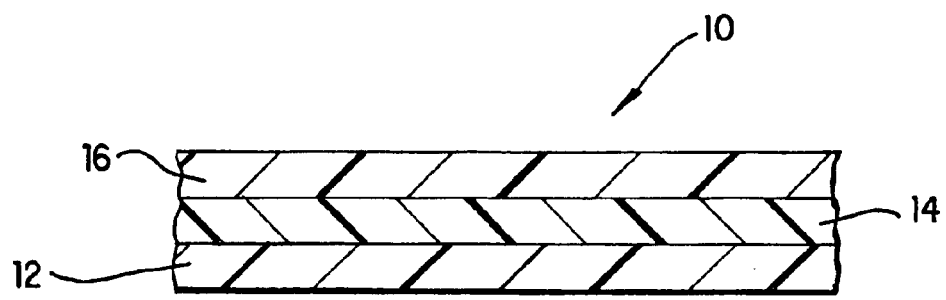
FIG. 2 is a schematic cross-section of an alternative embodiment of a film of the invention.

FIG. 2 shows a multilayer film with layers 12, 14, and 16.

Layers 12, 14, and 16 are preferably polymeric.

Layer 12 comprises the poly(lactic acid) as a functional barrier.

Layer 14 comprises an oxygen scavenger, preferably a polymeric oxygen scavenger, more preferably one of the materials described above.

Layer 16 comprises an oxygen barrier material, such as ethylene vinyl alcohol copolymer (EVOH), saran (vinylidene chloride copolymer), polyester, polyamide, etc.

Figure 3:
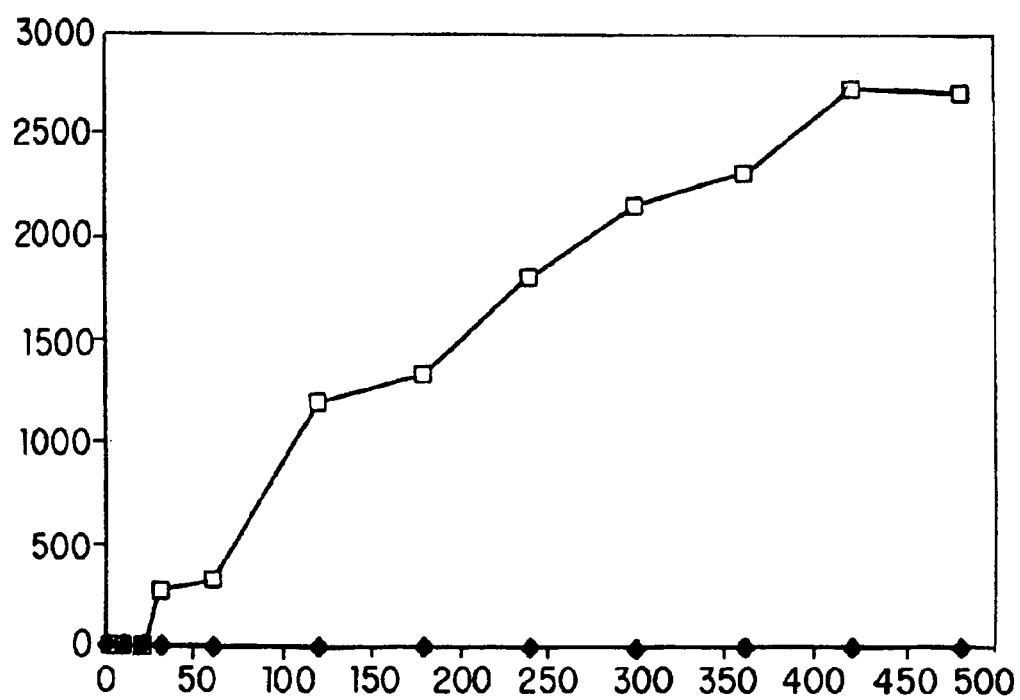
FIG. 3 illustrates a graph representing acetaldehyde migration through an example of the invention, and a comparative example.

FIG. 3 illustrates a graph in which the horizontal "x" axis represents time in minutes and the vertical "y" axis represents acetaldehyde migration through some of the examples, in units of area under the curve of a gas chromatograph peak. The curve plotted by the diamond shaped symbol represents acetaldehyde migration over time through the film of Example 1. The curve plotted by the square shaped symbol represents acetaldehyde migration over time through the film of Comparative 1.

The invention may be further understood by reference to the examples shown below. Table 1 identifies the materials used in the examples.

TABLE 1

| MATERIAL | TRADENAME | SOURCE | DESCRIPTION |
|---|---|---|---|
| $PLA_1$ | Lacty ™ | Shimadzu | poly(lactic acid) |
| $PE_1$ | Dowlex 2244A | Dow | LLDPE, an ethylene/1-octene copolymer with a density of 0.917 g/cc |
| $PE_2$ | PE1017 | Chevron | LDPE |

TABLE 1-continued

| MATERIAL | TRADENAME | SOURCE | DESCRIPTION |
|---|---|---|---|
| $EV_1$ | LD 318.92 | Exxon | ethylene vinyl acetate copolymer with 9% vinyl acetate comonomer |
| $EV_2$ | AC 400A | Allied | ethylene vinyl acetate copolymer |
| $EV_3$ | PE 1375 | Rexene | ethylene vinyl acetate copolymer with 3% vinyl acetate comonomer |
| $AD_1$ | Adcote 530 and Coreactant 9L23 | Morton International | adhesive mixture comprising silane, isocyanate, glycol, and alkyl acetate |
| $OB_1$ | 50m-44 Mylar ™ | DuPont | saran-coated polyethylene terephthalate film |
| $OS_1$ | Taktene 1202 | Bayer | 1,4 polybutadiene |
| $OS_2$ | Vector ™ 8508-D | Dexco | styrene/butadiene copolymer |
| $CAT_1$ | cobalt oleate | Shepherd | transition metal catalyst |
| $PI_1$ | benzoyl-biphenyl | | photoinitiator |

Certain materials were blended together for the film structures, and these blends are identified as follows:

$OSB_1 = 54\%\ PE_2 + 36\%\ OS_1 + 7.335\%\ EV_1 + 1.5\%\ EV_2 + 0.1\%\ PI_1 + 1.065\%\ CAT_1$.

$OSB_2 = 90\%\ OS_2 + 7.335\%\ EV_1 + 1.5\%\ EV_2 + 0.1\%\ PI_1 + 1.065\%\ CAT_1$.

It has been found that oxygen scavenging structures can generate reaction byproducts which can affect the taste and smell of the packaged material or raise food regulatory issues. These by-products include aldehydes, acids, ketones, and the like. An aldehyde migration test was developed to identify potential functional barriers. In this test, acetaldehyde was chosen as the model aldehyde compound because it is relatively mobile. The film sample was sandwiched between two halves of a cell with a clamp and two o-rings. Acetaldehyde was introduced to one half of the cell. A gas chromatograph was used to determine the concentration of acetaldehyde which migrated through the film sample and into the other half of the cell.

In Table 2, a monolayer film and a comparative monolayer film are disclosed.

TABLE 2

| EXAMPLE | STRUCTURE |
|---|---|
| 1 | $PLA_1$ |
| COMP.1 | $PE_1$ |

The target (and approximate actual) gauge (in mils) of each monolayer was 2 mils. Acetaldehyde migration through the monolayers are shown in FIG. 3. A functional barrier can significantly reduce acetaldehyde migration through the film sample. Poly(lactic acid) can be considered a functional barrier.

In Table 3, two film structures in accordance with the invention, and four comparatives, are disclosed. In Ex.1 and 2, a poly(lactic acid) monolayer was clamped to a multilayer film. In Comp. 1 and 2, no monolayer material was clamped to a multilayer film. In Comp. 3 and 4, a LLDPE monolayer was clamped to a multilayer film. The target (and approximate actual) gauge (in mils) of the multilayer film was about 2.5 mils.

TABLE 3

| EXAMPLE | STRUCTURE |
|---------|-----------|
| 2 | $OB_1//AD_1//EV_3/OSB_1/PE_1/$ clamped to $PLA_1$ |
| 3 | $OB_1//AD_1//EV_3/OSB_2/PE_1/$ clamped to $PLA_1$ |
| Comp.2 | $OB_1//AD_1//EV_3/OSB_1/PE_1$ |
| Comp.3 | $OB_1//AD_1//EV_3/OSB_2/PE_1$ |
| Comp.4 | $OB_1//AD_1//EV_3/OSB_1/PE_1/$ clamped to $PE_1$ |
| Comp.5 | $OB_1//AD_1//EV_3/OSB_2/PE_1/$ clamped to $PE_1$ |

Table 5 shows the concentration of several extractables detected in films of the invention. The films were extracted with 95% ethanol, as a food simulant. The concentration of each extractable is in units of parts per billion (ppb). Table 4 identifies these extractables. Poly(lactic acid) can reduce the concentration of certain extractables which could cause regulatory issues.

TABLE 4

| ABBREVIATION | DESCRIPTION |
|---|---|
| $E_1$ | formaldehyde |
| $E_2$ | acetaldehyde |
| $E_3$ | acrolein |
| $E_4$ | propanal |

TABLE 5

|  | EX.2 | EX.3 | C.2 | C.3 | C.4 | C.5 |
|---|---|---|---|---|---|---|
| $E_1$ | <34 | <11 | <34 | <34 | <34 | <34 |
| $E_2$ | <34 | <11 | 21 | 34 | 29 | 35 |
| $E_3$ | <11 | <11 | 22 | 75 | 49 | 103 |
| $E_4$ | <34 | <34 | 23 | 49 | 38 | 54 |

The film of the invention can been made by any conventional means, including coextrusion, lamination, extrusion coating, extrusion lamination, or corona bonding, and then optionally irradiated and/or oriented. They can be made heat shrinkable through orientation or tenterframing if desired, at orientation ratios of 1:2 to 1:9 in either or both of the machine and transverse directions. For shrink applications, they can be made to have a free shrink of at least 10%, more preferably at least 20%, most preferably at least 30%, in either or both directions at 90° C.

Various changes and modifications may be made without departing from the scope of the invention.

For example, the poly(lactic acid) can be used in more than one layer of the multilayer film. Different poly(lactic acid) polymers can be used in the same film.

Although it is preferred that the poly(lactic acid) be used in the film and as a packaging material such that the poly(lactic acid) is disposed closer to the contents of the package, which can be food or any oxygen-sensitive product, than the oxygen scavenger, there may be applications where the poly(lactic acid) is disposed "outside of" the oxygen scavenger, such that the oxygen scavenger is disposed closer to the contents of the package than the poly (lactic acid).

The poly(lactic acid) can also be disposed on both sides of the oxygen scavenger. The poly(lactic acid) can also be disposed in the same layer as the oxygen scavenger.

Any suitable polymeric materials can be employed in films containing the poly(lactic acid), and are not limited to those listed herein.

Although the use of poly(lactic acid) is disclosed herein primarily with respect to films, this material could be used as a coating, or absorbed into a variety of other supports for scavenging or other uses, such as a layer or coating on another object, or as a bottle cap or bottle liner, as an adhesive or non-adhesive insert, sealant, gasket, fibrous matte or other inserts, or as a non-integral component of a rigid, semi-rigid, or flexible container.

Poly(lactic acid) shows utility in reducing the migration of materials that can affect odor and/or taste. Such materials are, for example, acids, aldehydes, ketones, and the like. Materials such as olefins, dienes, hydrocarbons, and aromatic compounds may also affect odor and taste. "Organoleptically significant compounds" thus refers herein to the above named materials, and any others, that affect the taste or odor of a product in which they are present. Therefore, although poly(lactic acid) has been found especially useful in combination with an oxygen scavenger, it can be used without the presence of an oxygen scavenger, in the event it is desired to reduce the migration of organoleptically significant compounds, through an article, regardless of the source of these materials. In such oxygen scavengerfree articles, poly(lactic acid) can be used in any suitable form, including monolayer or multilayer films, or as a coating or the like. Poly(lactic acid) can be used on one or both surfaces of an article, and is preferably disposed between the source of the organoleptically significant compound on the one hand, and the product to be packaged, or the subject to be isolated or shielded from the organoleptically significant compound on the other hand. All of the embodiments, examples, and disclosure herein with respect to an article comprising poly(lactic acid) in combination with an oxygen scavenger, apply *mutatis mutandis* to the use of poly(lactic acid) to reduce migration of the above-described organoleptically significant compounds where no or substantially no oxygen scavenger is present.

What is claimed is:

1. A film comprising an oxygen scavenger and poly(lactic acid), wherein the oxygen scavenger comprises a material selected from the group consisting of:

i) oxidizable compound and a transition metal catalyst, ii) ethylenically unsaturated hydrocarbon and a transition metal catalyst, iii) ascorbate, iv) isoascorbate, v) sulfite, vi) ascorbate with a transition metal catalyst, the catalyst comprising a simple metal or salt, or a compound, complex or chelate of the transition metal, vii) a transition metal complex or chelate of a polycarboxylic acid, salicylic acid, or polyamine, and viii) tannin.

2. The film of claim 1 wherein the film comprises a layer comprising an oxygen scavenger and poly(lactic acid).

3. The film of claim 1 further comprising an oxygen barrier layer.

4. The film of claim 1 further comprising an abuse resistant layer.

5. The film of claim 1 further comprising a heat sealable layer.

6. The film of claim 1 wherein the film is cross-linked.

7. The film of claim 1 wherein the film is oriented.

8. The film of claim 1 wherein the film is heat shrinkable.

9. The film of claim 1 wherein the poly(lactic acid) is blended with a polymer selected from the group consisting of a polymer derived from alkyl acrylate monomer, and a polymer derived from vinyl acetate monomer.

10. The film of claim 1 wherein the film comprises:
   a) a layer comprising an oxygen scavenger; and
   b) a layer comprising poly(lactic acid).

11. The film of claim 10 wherein the layer comprising poly(lactic acid) has an oxygen permeability of greater than 5,000 cc-mil per sq. meter per day per atmosphere at 25° C.

12. A polymeric functional barrier coating on an oxygen scavenging lacquer, comprising an oxygen scavenger and poly(lactic acid) wherein the oxygen scavenger comprises a material selected from the group consisting of:
   i) oxidizable compound and a transition metal catalyst,
   ii) ethylenically unsaturated hydrocarbon and a transition metal catalyst,
   iii) ascorbate,
   iv) isoascorbate,
   v) sulfite,
   vi) ascorbate with a transition metal catalyst, the catalyst comprising a simple metal or salt, or a compound, complex or chelate of the transition metal,
   vii) a transition metal complex or chelate of a polycarboxylic acid, salicylic acid, or polyamine, and
   viii) tannin.

13. A gasket comprising an oxygen scavenger and poly(lactic acid), wherein the oxygen scavenger comprises a material selected from the group consisting of:
   i) oxidizable compound and a transition metal catalyst,
   ii) ethylenically unsaturated hydrocarbon and a transition metal catalyst,
   iii) ascorbate,
   iv) isoascorbate,
   v) sulfite,
   vi) ascorbate with a transition metal catalyst, the catalyst comprising a simple metal or salt, or a compound, complex or chelate of the transition metal,
   vii) a transition metal complex or chelate of a polycarboxylic acid, salicylic acid, or polyamine, and
   viii) tannin.

14. A package comprising:
   a) an oxygen sensitive article; and
   b) a container into which the oxygen sensitive article is disposed, the container comprising
      i) a layer comprising an oxygen scavenger, wherein the oxygen scavenger comprises a material selected from the group consisting of:
         (a) oxidizable compound and a transition metal catalyst.
         (b) ethylenically unsaturated hydrocarbon and a transition metal catalyst,
         (c) ascorbate,
         (d) isoascorbate,
         (e) sulfite
         (f) ascorbate with a transition metal catalyst, the catalyst comprising a simple metal or salt, or a compound, complex or chelate of the transition metal,
         (g) a transition metal complex or chelate of a polycarboxylic acid, salicylic acid, or polyamine, and
         (h) tannin, and
      ii) a layer comprising poly(lactic acid).

\* \* \* \* \*